March 13, 1945.                L. LOVISONE                2,371,454
                            TREE GRAFTING GAUGE
                           Filed Sept. 20, 1944
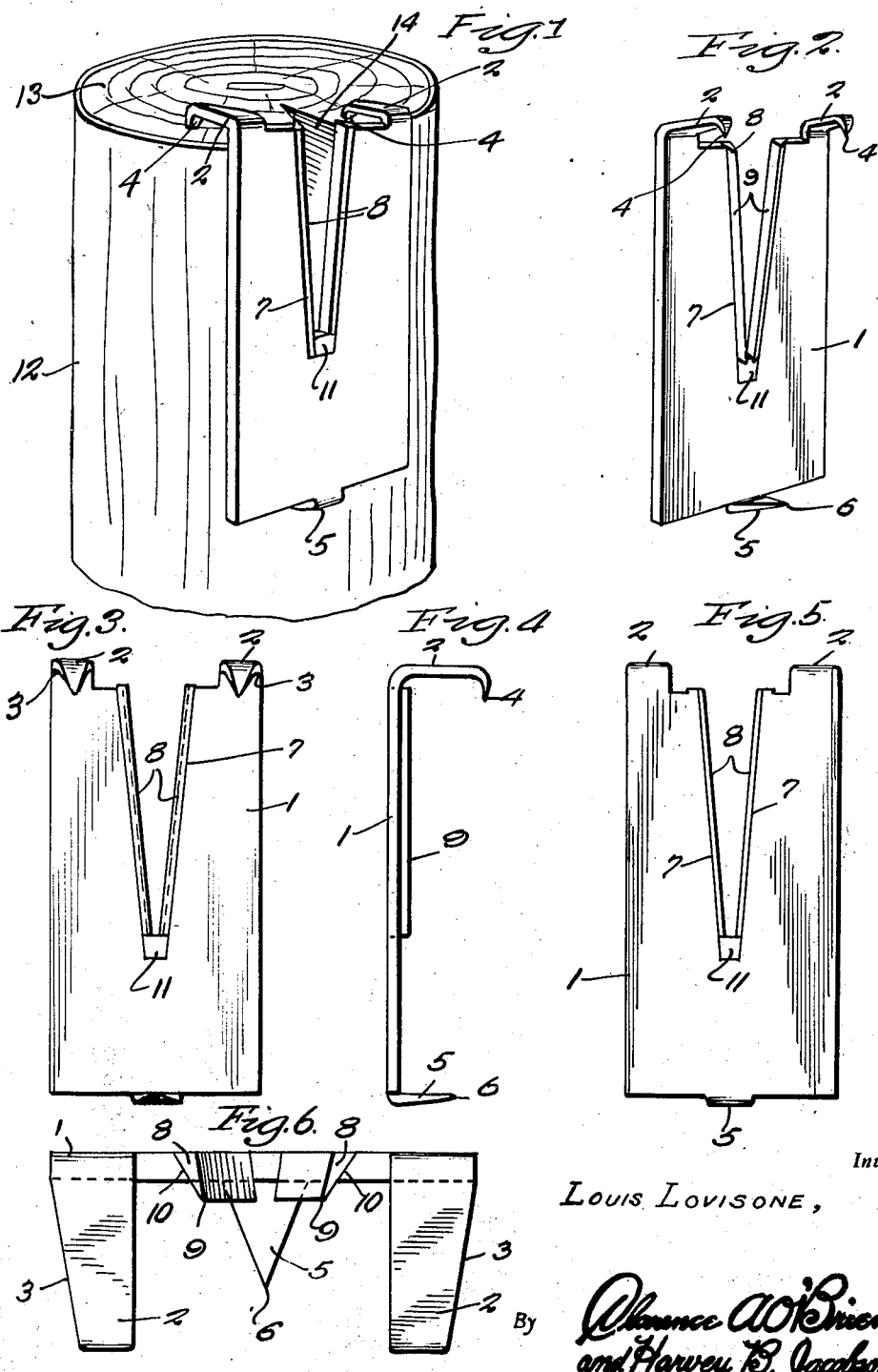
Inventor
LOUIS LOVISONE,
By *Clarence A. O'Brien and Harvey B. Jacobson*
                                              Attorneys Patented Mar. 13, 1945

2,371,454

UNITED STATES PATENT OFFICE 2,371,454

TREE GRAFTING GAUGE

Louis Lovisone, Lower Lake, Calif.

Application September 20, 1944, Serial No. 555,006

3 Claims. (Cl. 47—6)

My invention relates to improvements in grafting gauges for use in grafting scions to tree limbs, the primary object in view being to provide a simply constructed, inexpensive device which will save time and labor in such grafting operations, enable the grafting operation to be performed with precision and accuracy, obviate damage to trees, and provide for accurate fitting of the scions in grafting.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in perspective illustrating my improved grafting gauge applied to a tree limb and its use when applied, Figure 2 is a view in perspective of the grafting gauge detached and illustrating the gauge from the rear thereof, Figure 3 is a view in rear elevation, Figure 4 is a view in side elevation, Figure 5 is a view in front elevation, Figure 6 is a view in end elevation, looking at the leading end of the gauge, and drawn to an enlarged scale.

Referring to the drawing by numerals, my invention, in the preferred illustrated embodiment thereof, comprises an elongated, rectangular gauge plate 1 of steel, preferably, and any suitable size, which is provided at one end, hereinafter termed the leading end, with a pair of right angled corner prongs 2, preferably curved longitudinally, and extending from what constitutes the rear side of the plate 1 with tapering edges 3 and hooked, sharp pointed terminals 4. A single prong 5 tapering edgewise and sidewise to a point 6 extends from the other, or tail, end of said plate 1 at a right angle thereto and from the rear side of the plate 1 in the longitudinal center of the same. The prong 5, for reasons presently seen, may be shorter than the prongs 2. A relatively long V-shaped notch 7 is provided in the longitudinal center of the plate 1 and which diverges toward the leading end of said plate and opens onto said end. A pair of strips 8, of case-hardened steel, are suitably secured to the sides of the notch 7, as a lining for the sides, and are provided with sharp longitudinal cutting edges 9 on the rear side of the plate 1 projecting for a suitable distance from said side. The sides of the notch 7 are beveled, as at 10, to converge transversely rearwardly and the strips 8 taper transversely to the cutting edges 9. The strips 8 may be welded to the plate 1, as indicated, for example, at 11. As will be seen by reference to Figure 6, the described beveling of the sides of the notch 7 and the tapering form of the strips 9 slant the strips so that the same converge transversely and rearwardly. This provides for the cutting edges 9 holding firmly in a limb into which they may be forced.

In a tree grafting operation, after a limb, such as is designated 12, has been cut off to provide a flat end 13, the described gauge is disposed flatwise against the selected side of the limb 12 with the prongs 2 driven into said end 12 and the prong 5 driven into the side of said limb, also the cutting edges 9 of the strips 8. A V-shaped gash, or cut, 14 is then formed in said side of the limb 12 from the cut-off end 12 using the notch formed by the strips 8 as a gauge or guide. The gash, or cut, 14 may be started before the gauge is applied and finished as described, if desired. For instance, the limb 12 may be sawed to start the notch and the saw cut spread by wedging and the gash, or cut, when finished with the aid of the gauge. The gauge may then be imposed against the end portion of a scion, not shown, to mark said end by means of the cutting edges 9 of the strips 8 and cut with a knife to shape the same for fitting in the gash, or cut, 14.

As will be seen, my invention enables formation of the gash, or cut, in the tree and trimming of the scion to fit the gash, or cut, with absolute accuracy and with a minimum of time and labor.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A grafting gauge for application to a tree limb having a cut-off end, said gauge comprising an elongated rectangular plate adapted to be opposed flat against said limb with one end substantially flush with said end of the limb and provided with an elongated V notch in the longitudinal center thereof opening onto said end of the plate and for use as a guide in forming a similarly shaped cut in said limb, and means on said plate for anchoring the same to said limb.

2. A grafting gauge for application to a tree limb having a cut-off end, said gauge comprising an elongated rectangular plate adapted to be opposed flat against said limb with one end substantially flush with said end of the limb and provided with an elongated V notch in the longitudinal center thereof opening onto said end of the plate and for use as a guide in forming a similarly shaped cut in said limb, and means on said plate for anchoring the same to said limb, comprising a pair of right angled corner prongs on said end of the plate for hooking over the cut-off end of the limb, and driving into the same, and a single prong on the other end of said plate extending laterally and centrally from said other end for driving into the side of the limb.

3. A grafting gauge for application to a tree limb having a cut-off end, said gauge comprising an elongated rectangular plate adapted to be opposed flat against said limb with one end substantially flush with said end of the limb and provided with an elongated V notch in the longitudinal center thereof opening onto said end of the plate and for use as a guide in forming a similarly shaped cut in said limb, and means on said plate for anchoring the same to said limb, and a pair of strip-like members extending along the sides of said notch and having sharp longitudinal edges for penetrating the side of said limb.

LOUIS LOVISONE.